(12) United States Patent
Mayer et al.

(10) Patent No.: US 11,579,245 B2
(45) Date of Patent: Feb. 14, 2023

(54) RADAR SENSOR SYSTEM AND METHOD FOR OPERATING A RADAR SENSOR SYSTEM

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 16/958,143

(22) PCT Filed: Jan. 12, 2019

(86) PCT No.: PCT/EP2019/050728
§ 371 (c)(1),
(2) Date: Jun. 25, 2020

(87) PCT Pub. No.: WO2019/166146
PCT Pub. Date: Sep. 6, 2019

(65) Prior Publication Data
US 2020/0355787 A1    Nov. 12, 2020

(30) Foreign Application Priority Data
Mar. 1, 2018  (DE) ............ 10 2018 203 117.7

(51) Int. Cl.
*G01S 7/03*  (2006.01)
*G01S 7/40*  (2006.01)
(Continued)

(52) U.S. Cl.
CPC .............. *G01S 7/03* (2013.01); *G01S 7/4004* (2013.01); *G01S 13/00* (2013.01); *H01Q 1/24* (2013.01); *G01S 2013/0245* (2013.01)

(58) Field of Classification Search
CPC .......... G01S 7/03; G01S 7/4004; G01S 13/00; G01S 2013/0245; G01S 13/87; G01S 13/931; G01S 7/032; H01Q 1/24
See application file for complete search history.

(56) References Cited

U.S. PATENT DOCUMENTS

| | | | |
|---|---|---|---|
| 9,478,858 B1* | 10/2016 | West | G01S 7/414 |
| 9,726,756 B2* | 8/2017 | Jansen | G01S 13/02 |
| 2011/0122026 A1* | 5/2011 | DeLaquil | H01Q 3/2682 342/372 |

FOREIGN PATENT DOCUMENTS

| | | |
|---|---|---|
| DE | 102012201990 A1 | 8/2013 |
| DE | 102015218542 A1 | 3/2017 |

(Continued)

OTHER PUBLICATIONS

International Search Report for PCT/EP2019/050728, dated May 2, 2019.

*Primary Examiner* — Bernarr E Gregory
*Assistant Examiner* — Yonghong Li
(74) *Attorney, Agent, or Firm* — Norton Rose Fulbright US LLP; Gerard Messina

(57) ABSTRACT

A radar sensor system having a defined number of HF components, with each of the HF components having at least one antenna for transmitting and/or receiving of radar waves in each case, and at least one antenna control for operating the at least one antenna; and a synchronization network, which is connected to all HF components and via which an operating frequency of all HF components is able to be synchronized; with a synchronization master according to at least one defined criterion being able to be provided by all HF components.

8 Claims, 2 Drawing Sheets

(51) Int. Cl.
*G01S 13/00* (2006.01)
*H01Q 1/24* (2006.01)
*G01S 13/02* (2006.01)

(56) References Cited

FOREIGN PATENT DOCUMENTS

EP 2881752 A1 6/2015
JP 2005227030 A * 8/2005

* cited by examiner

RADAR SENSOR SYSTEM AND METHOD FOR OPERATING A RADAR SENSOR SYSTEM

FIELD

The present invention relates to a radar sensor system. In addition, the present invention relates to a method for operating a radar sensor system. The present invention also relates to a computer program product.

BACKGROUND INFORMATION

The market for driver-assistance systems is currently in transition. While it was mainly cost-effective sensor systems that stood in the foreground during the past few years, there is currently a trend toward highly autonomous driving with much greater demands on the sensor system. In vehicles that offer a high degree of driver-assistance functions or automated driving functions, an increasing number of sensors is installed for the control and regulation of the functions. The sensors installed in the vehicles can be radar sensors or lidar sensors, for instance, and must provide the highest accuracy possible. Through the use of precise sensors, the functional safety and the reliability of the autonomous or semi-autonomous driving functions are able to be ensured.

In vehicles featuring autonomous driving functions or automated driver-assistance functions, errors, in particular E/E errors according to ISO26262, lead to the deactivation of the respective radar sensor or the bus communication. In the case of radar sensors that offer high performance and are equipped with many antennas, HF channels and memories, the likelihood of a failure increases greatly. According to ISO26262, this likelihood is determined in FIT (what is known as Failure in Time, $10^{-9}$/h). A component may thus have maximally 100 FIT according to ASIL-B or ASIL-C before it will be deactivated. The safe state of the respective component is not considered in this context. For example, if a quartz oscillator has 30 FIT (SN 29500-4) and the safe state is unable to be reached, then this quartz oscillator alone already takes up 30% of the available FIT rates of the radar sensor.

SUMMARY

It is an object of the present invention to provide a radar sensor system having an improved operating characteristic.

According to a first aspect of present invention, this object is achieved by an example radar sensor system, which includes:
 a defined number of HF components;
  with each of the HF components having at least one antenna for transmitting and/or receiving radar waves, and at least one antenna control for operating the at least one antenna; and
 a synchronization network, which is connected to all HF components and via which an operating frequency of all HF components is able to be synchronized; with
 a synchronization master according to at least one defined criterion being able to be provided by all HF components.

In this way, the function of the synchronization master for the operating frequency is assumed by all HF components, so that an improved operating characteristic of the radar sensor system is supported. For example, this advantageously makes it possible to reduce an emergency operation functionality of the radar sensor system and/or thermal drift between a plurality of HF components.

According to a second aspect of the present invention, the object may be achieved by an example method for operating a radar sensor system, the example method having the following steps:
 transmitting and receiving radar waves using a defined number of HF components with the aid of at least one antenna in each case; and
 synchronizing an operating frequency of the HF components with the aid of a synchronization network, which is connected to the defined number of HF components; with
 a function of a synchronization master according to at least one defined criterion being assumed by all HF components.

Advantageous further developments of the radar sensor system in accordance with the present invention are described herein.

One advantageous further development of the radar system in accordance with the present invention includes that the synchronization master is randomly selectable from among the HF components.

According to another advantageous further development of the radar sensor system in accordance with the present invention, the synchronization master is selectable from among the HF components according to a temperature criterion. Because of the fact that the synchronization master draws more electric power and generates thermal energy, the thermal loading of the radar sensor system may advantageously be more uniform.

Another advantageous further development of the radar sensor system in accordance with the present invention is characterized in that the synchronization master is selectable in such a way that temperature differences between the HF components are kept uniform to a defined degree.

Another advantageous further development of the radar sensor system in accordance with the present invention includes that the synchronization master is selectable in such a way that the coldest HF component is able to be selected as the synchronization master in each case. Using the mentioned measures, the occurrence of temperature effects is advantageously reduced so that, for example, an angle estimation characteristic of the radar sensor system may be improved.

Another advantageous further development of the radar sensor system in accordance with the present invention includes that the synchronization master is selectable in such a way that a defined phase difference is able to be provided between the synchronization master and the synchronization slaves. This advantageously supports a uniform sensing characteristic of the radar sensor system.

An additional advantageous further development of the radar sensor system in accordance with the present invention includes that the synchronization master is able to be provided from among the HF components according to a defined operating pattern. For example, an operation of the synchronization master in a clockwise direction or in a counterclockwise direction of the geometrical placement of the HF components may take place as a result, thereby supporting the uniform loading of the HF components in an advantageous manner.

Using greatly simplified schematic illustrations of preferred exemplary embodiments of the present invention, the present invention will be described in greater detail below.

DETAILED DESCRIPTION OF EXAMPLE EMBODIMENTS

Figure 1:
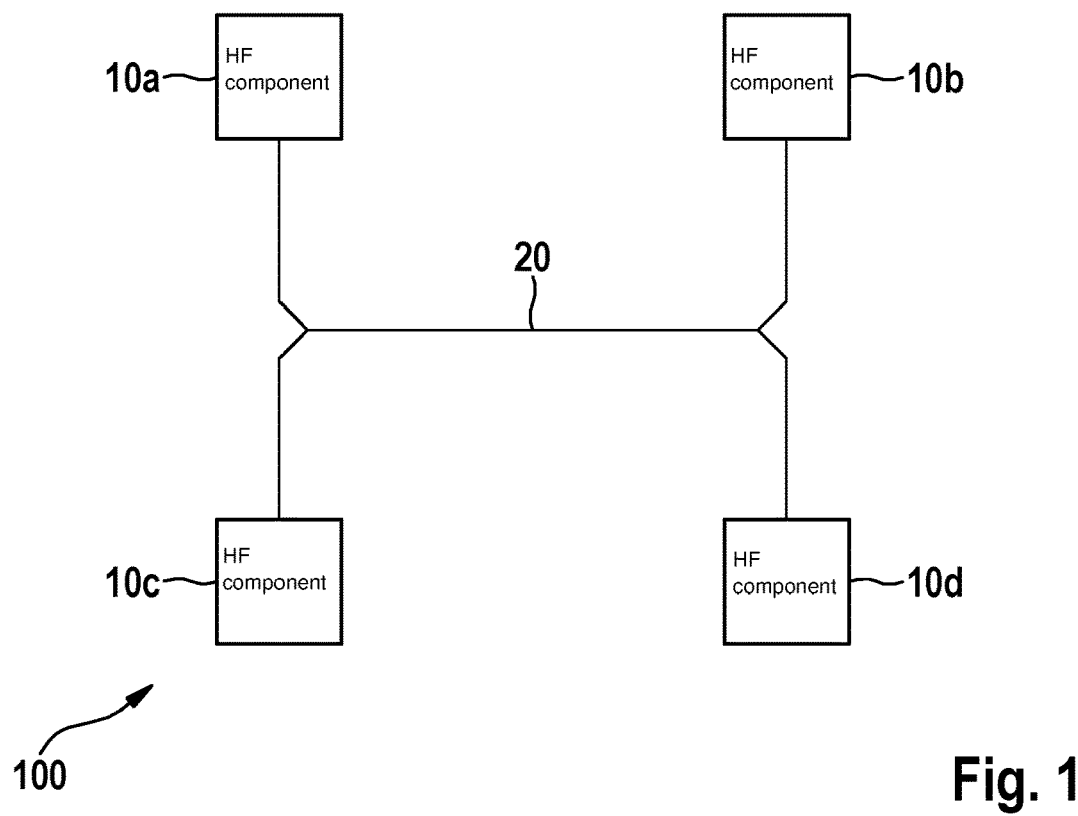
FIG. 1 shows a schematic representation of a provided radar sensor system in accordance with the present invention.

Identical constructive elements in the figures have been provided with matching reference numerals.

Generally, current radar sensors have many HF channels for generating and receiving radar waves. All HF components may be in operation at the same time in a normal operation. Given a symmetrical design, such radar sensors are able to be subdivided into a plurality of sub-sensors. Each sub-sensor may thus have a corresponding share of HF components or HF channels of the radar sensor. In this way, for example, a sub-sensor of the radar sensor may allow for autonomous driving of a vehicle at a restricted speed in a potential emergency operation. This is also able to be realized when components of other sub-sensors are no longer operative.

The development of the radar sensor system may be made up of conventional cost-effective basic components, for instance. By parallelizing multiple components of the same type, the capacity and the accuracy of the radar sensor system is able to be improved. A redundancy for the purpose of providing a reliable function of the system may additionally be possible by using a plurality of components of the same type. An emergency operation of the radar sensor system can thereby be implemented in a technically uncomplicated manner. Toward this end, however, redundancy must be available not only with regard to the HF components and the microcontrollers, but also in the clock pulse generation. For example, the HF components may be antenna controls or amplifiers developed in the form of MMICs (monolithic microwave integrated circuit).

Because a common clock pulse generator supplies all HF components with a usable or base frequency, the radar sensor system has high coherence. In particular, the different HF components are able to be operated at an identical operating frequency so that a redundant and coherent clock pulse supply of a plurality of HF components is possible.

Preferably, at least a portion of the HF components used in the radar sensor system is able to be supplied with a clock pulse or a usable frequency. In the normal operation, all HF components or antenna controls of the radar sensor system may be supplied with the same clock pulse by at least one clock pulse generator, and all data are thus able to be offset against one another.

In a normal operation of the radar sensor system, at least one clock pulse generator simultaneously supplies a clock pulse to all antenna controls or HF components. The clock pulse supply from one source makes it possible to realize a high coherence.

Alternatively or additionally, the clock pulse supply may be made up of a plurality of clock pulse generators operated in parallel. For example, if a clock pulse generator has a defect, then it is possible to activate or connect at least one further clock pulse generator by way of the control unit for the generation of a frequency.

FIG. 1 shows a schematic representation of a provided radar sensor system 100 in accordance with an example embodiment of the present invention. Radar sensor system 100 has four HF components 10a . . . 10d, which are developed as MMICs. The number four is only an example, and provided radar sensor system 100 could also have fewer or more than four HF components. In addition, a synchronization network 20 can be seen to which all HF components 10a . . . 10d are connected and which is used for synchronizing the operating frequency of all HF components 10a . . . 10d, with one HF component 10a . . . 10d functioning as the synchronization master component and the others as slave HF components during the synchronization process. Geometrical lengths of lines of synchronization network 20 are advantageously short in comparison with a radar resolution of radar sensor system 100, so that a propagation time of signals within synchronization network 20 is adapted to the radar resolution.

In addition, radar sensor system 100 includes antenna controls of HF components 10a . . . 10d. For the sake of simplicity, additional components of HF components 10a . . . 10d that are required for emitting and receiving radar waves such as antennas, amplifiers, oscillators etc., are not shown in the figures.

It is provided that the synchronization master component not always be the same during the operating period of radar sensor system 100, but that the function of the synchronization master component according to at least one defined criterion be assumed by all HF components 10a . . . 10d during the operating period of radar sensor system 100.

Generally, one component in a radar sensor system is assigned the role of the master, which assumes the high frequency generation and supplies the other HF elements with the HF synchronization signal. The HF synchronization signal is required in order to provide a high coherence of HF elements 10a . . . 10d so that a high angular resolution of radar sensor system 100 is possible. In the related art, specialized components are used for the generation of the high frequency and for the further signal processing.

However, in view of the ever increasing development costs of HF components, e.g., with higher mask costs for smaller node sizes, it has become apparent that the use of multiple component pieces of the same type may provide cost advantages despite the actual silicon surface being greater. In this way, the present invention provides the advantageous possibility of realizing a cost-effective and redundant radar sensor system.

The present invention provides for a rotating assignment of the role of the master from one HF component to all of the others. This advantageously results in favorable operating characteristics of radar sensor system 100, for instance in the thermo-management area.

Figure 2:
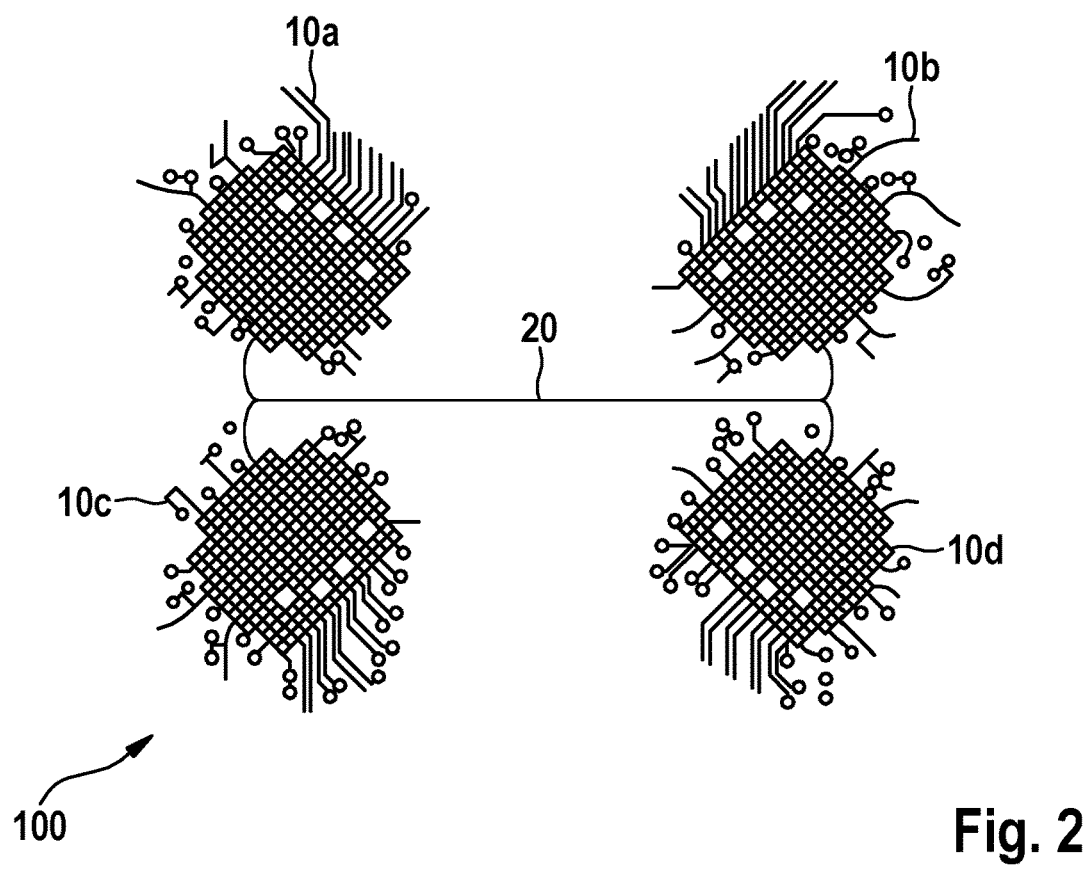
FIG. 2 shows a more detailed schematic representation of a provided radar sensor system in accordance with the present invention.

FIG. 2 shows the positioning of radar sensor system 100 from FIG. 1 with a higher degree of detail, and it can be seen that HF components 10a . . . 10d are disposed at a defined angle relative to one another in order to thereby allow for a shorter length of electric lines of synchronization network 20, so that a detection accuracy of radar sensor system 100 is able to be optimized.

During a normal operation of radar sensor system 100, a master component assumes a plurality of the tasks mentioned below:

the frequency generation using PLL (e.g., 77 GHz) and possibly a clock pulse generation (e.g., 50 MHz)

the output and amplification of the HF synchronization signal in part, the supply of the transmission signal the mixing into the baseband possibly, an AD conversion and output of the digital signals.

Generally, the first two tasks are exclusively assumed by the master HF component, with the three latter tasks being assumed by all involved HF components 10a . . . 10d of radar sensor system 100.

In the range of the upper limit temperature (high temperature HT), the increased power loss of the master component has the result that master component 10a . . . 10d has to be switched off earlier (or that it degrades in its performance) than slave components 10a . . . 10d, which means that the availability is reduced.

In addition, this component degrades more heavily across the service life because it is operating in the proximity of the HT limit temperature for longer periods of time. The present invention therefore provides for an ascertainment of the temperature of the individual HF components (e.g., with the aid of a temperature sensor) and for an allocation of the synchronization master role to the HF component 10a . . . 10d having the lowest temperature.

For if one and the same HF element 10a . . . 10d always has the master role and thus is warmer than the slave components, then its increased temperature in comparison with the slave elements leads to potential deviations of the phase in the baseband. For example, the master component has a phase in the baseband that is offset by 30° in relation to the slave components, this deviation resulting in errors in the angle estimate and should therefore not occur, if possible. The proposed rotation of master component 10a . . . 10d during the operation of radar sensor system 100 advantageously supports this goal.

In addition to the phase, the amplitude also exhibits drift across the temperature, so that temperature differences between HF components 10a . . . 10d should be avoided.

A plurality of defined selection criteria are able to be used for the function of the rotating master functionality:

rotating the master functionality according to a stochastic random principle;

assuming the master functionality from a "preferred side" of radar sensor system 100, for instance when the master HF component also generates the 50 MHz clock pulse and an emergency operation functionality is provided;

rotating the master functionality according to a predefined pattern, e.g., in a clockwise or counterclockwise manner of the geometrical positioning of HF components 10a . . . 10d.

Of course, still further criteria not previously described in greater detail are possible for the rotating operation of an HF component 10a . . . 10d as the master HF component of radar sensor system 100.

The provided method in accordance with an example embodiment of the present invention is advantageously able to be used not only in a radar sensor system but also in any product that encompasses a plurality of HF components. The provided radar sensor system is preferably used in the automotive sector.

Figure 3:
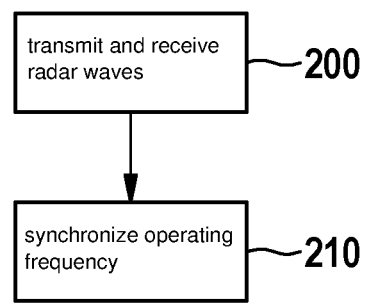
FIG. 3 shows a basic flow diagram of a provided method for operating a radar sensor system in accordance with the present invention.

FIG. 3 shows a basic flow diagram of an example method for operating a radar sensor system in accordance with the present invention.

In a step 200, the transmitting and receiving of radar waves using a defined number of HF components 10a . . . 10d is carried out with the aid of at least one antenna in each case.

In a step 210, a synchronization of an operating frequency of HF components 10a . . . 10d takes place with the aid of a synchronization network 20 which is connected to the defined number of HF components 10a . . . 10d, with a function of a synchronization master according to at least one defined criterion being assumed by all HF components 10a . . . 10d.

The provided method is advantageously able to be implemented in the form of a software that is running in a control device (not shown) of radar sensor system 100. This advantageously supports a simple modifiability of the present method.

One skilled in the art is therefore also able to realize embodiments that were not described or only partly described in the preceding text without departing from the core of the present invention.

What is claimed is:

1. A radar sensor system, comprising:

a defined number of HF components, each of the HF components having at least one antenna for transmitting and/or receiving radar waves, and at least one antenna control for operating the at least one antenna; and a synchronization network connected to all of the HF components and via which an operating frequency of all of the HF components is synchronized, wherein a synchronization master according to at least one defined criterion is providable by all of the HF components;

wherein the synchronization master is selectable so that a defined phase difference is providable between the synchronization master and synchronization slaves to support a uniform sensing characteristic of the radar sensor system, wherein the synchronization network is a network in which the HF components are connected and which is used for synchronizing the operating frequency of all of the HF components, with one of the HF components functioning as the synchronization master component and other ones of the HF components as slave HF components during the synchronization process, and wherein the master is selected based on the lowest temperature and/or that a switching pattern is a predefined pattern of a geometrical positioning.

2. The radar sensor system as recited in claim 1, wherein the synchronization master is selectable from among the HF components.

3. The radar sensor system as recited in claim 1, wherein the synchronization master is selectable from among the HF components according to a temperature criterion, so that temperature effects are reduced to improve an angle estimation characteristic of the radar sensor system.

4. The radar sensor system as recited in claim 3, wherein the synchronization master is selectable so that temperature differences between the HF components are kept uniform to a defined extent.

5. The radar sensor system as recited in claim 3, wherein the synchronization master is selectable so that a coldest one of the HF component is selectable as the synchronization master in each case, so that temperature effects are reduced to improve the angle estimation characteristic of the radar sensor system.

6. The radar sensor system as recited in claim 3, wherein the synchronization master is selectable so that a defined phase difference is providable between the synchronization master and synchronization slaves of the HF components.

7. The radar sensor system as recited in claim 3, wherein the synchronization master is providable from among the HF components according to a defined operating pattern to support a uniform loading of the HF components.

8. A method for operating a radar sensor system, the method comprising:
  transmitting and receiving radar waves using a defined number of HF components using at least one antenna in each case; and
  synchronizing an operating frequency of the HF components using a synchronization network which is connected to the defined number of HF components, wherein a function of a synchronization master according to at least one defined criterion is assumed by all HF components;
  wherein the synchronization master is selectable so that a defined phase difference is providable between the synchronization master and synchronization slaves to support a uniform sensing characteristic of the radar sensor system,
  wherein the synchronization network is a network in which the HF components are connected and which is used for synchronizing the operating frequency of all of the HF components, with one of the HF components functioning as the synchronization master component and other ones of the HF components as slave HF components during the synchronization process, and
  wherein the master is selected based on the lowest temperature and/or that a switching pattern is a predefined pattern of a geometrical positioning.

\* \* \* \* \*